Jan. 11, 1949.　　　　C. I. HALL　　　　2,458,939
CONTROL DEVICE
Filed June 13, 1944
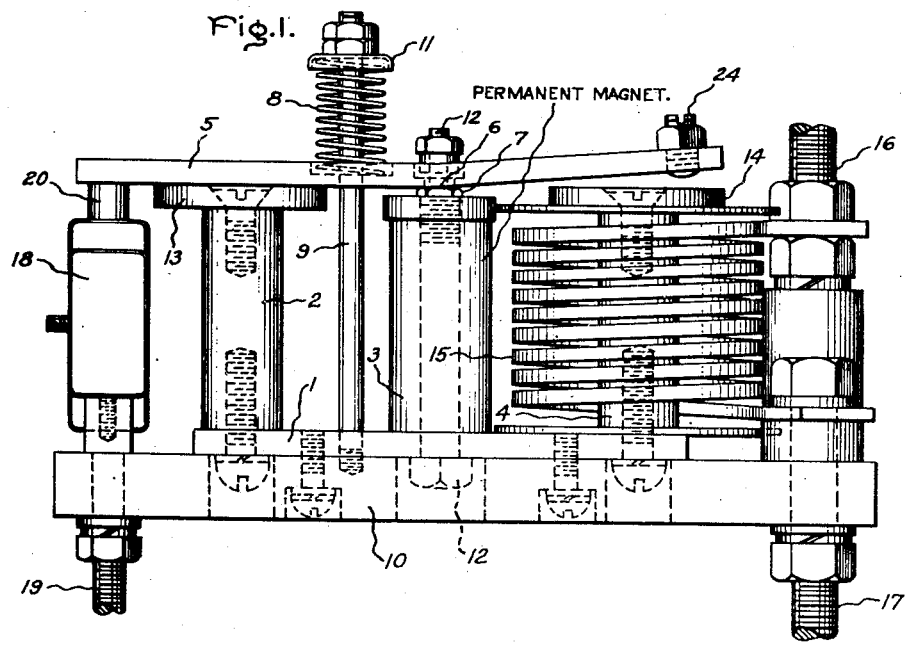
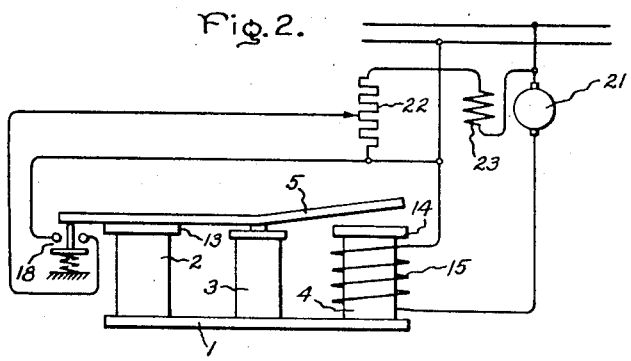
Inventor:
Chester I. Hall,
by Harry E. Dunham
His Attorney.

Patented Jan. 11, 1949

2,458,939

UNITED STATES PATENT OFFICE 2,458,939

CONTROL DEVICE

Chester I. Hall, Vischers Ferry, N. Y., assignor to General Electric Company, a corporation of New York Application June 13, 1944, Serial No. 540,049

2 Claims. (Cl. 200—93)

My invention relates to control systems and devices, particularly to control means responsive to the current in a direct current motor circuit for increasing the regenerative braking effect of the motor in the event that the motor is being overhauled by its load, such as a hoist, at an excessive speed, and has for its object a simple, reliable and low cost control means of this type.

More specifically, my invention relates to a direct current sensitive device which is connected in the armature circuit of the driving motor. This device remains in a predetermined normal position as long as the motor is driving its load, and as long as the speed of the motor when being overhauled by the load is below a predetermined value as determined by the value of the regenerative braking current flowing through the device. When this regenerative current exceeds a predetermined maximum value indicating an excessive motor speed, the device picks up and short-circuits a resistance in the field of the driving motor whereby the field excitation is increased to effect an increase in the regenerative braking of the motor, which in turn reduces the speed of the motor.

In carrying out my invention in one form, I provide a relay provided with a three-legged magnet core, the middle leg of which consists of a permanent magnet and on which an armature is pivotally mounted for movement to bring its opposite ends into engagement with one or the other of the pole faces on the two outside legs. On one of the outside legs is a current coil which is connected in the circuit of the driving motor so as to be responsive to the motor current. Furthermore, the armature is biased by a suitable spring into engagement with the pole face on the other core leg. The polarities of the fluxes produced by the permanent magnet and the coil are such that during motoring operation the flux set up by the coil is in the same direction through the other outside core leg as the permanent magnet flux thereby holding the armature in its spring biased position, the two fluxes opposing each other in the first core leg. In the event of a reversal of motor current for regenerative braking, the current flux reverses and opposes the permanent magnet flux in the other core leg thereby effecting the movement of the armature against its bias and increasing the motor field when the motor current reaches a predetermined excessive value.

For a more complete understanding of my invention, reference should be had to the accompanying drawing, Fig. 1 of which is a side elevation view of a current responsive control device or relay embodying my invention; while Fig. 2 is a diagrammatic representation of a motor circuit embodying the relay of Fig. 1.

Referring to the drawing, in carrying out my invention in one form I provide a relay comprising a three-legged core having a bottom cross magnet core member 1 and three upright legs 2, 3, and 4. The middle core leg 3 is a permanent magnet producing a polarizing magnetic flux in a predetermined direction in the magnet core. Preferably the magnet 3 is made of material having a relatively great magnetic retentivity and having a low magnetic permeability. Preferably I use an alloy consisting of aluminum, nickel, copper and iron, such as described and claimed in Patent 1,947,274 issued on February 13, 1934, to William E. Ruder, and Patent 2,027,997, issued on January 14, 1936, to Tokushichi Mishima. For example, I may use an alloy consisting of 12 per cent aluminum, 25 per cent nickel, and 5 per cent copper by weight, the balance being mainly iron. This magnet 3 is magnetized with north and south poles, respectively, at its two ends. The legs 2 and 4 and the bottom cross member 1, together with the armature 5, are made from magnet core iron.

The armature 5 is a bar or strap shaped with a bend 6 intermediate its ends, which bend constitutes a connection between the two straight portions of the armature extending therefrom and out of alignment with each other by a small angle such as a few degrees, as shown in the drawing. This bend 6 rests on a suitable support, such as a nut 7, only one of which is shown, on the upper end of the magnet 3 so that the bend constitutes a pivot knife edge or rocker bearing for the armature. By means of this mounting, the armature at the bend is in continuous flux conducting relation with the middle leg or magnet 3.

A helical pressure biasing spring 8 applies a downwardly directed force to the left-hand portion of the armature thereby normally to hold this portion, as shown, in engagement with the upper end of the leg 2 which constitutes a pole face. This spring is mounted on a rod 9 whose lower ends is secured to a supporting base 10 made of electrically insulating material. On the upper end of the rod is a washer 11 forming a seat for the upper end of the spring.

By means of suitable screws, the three legs are secured to the cross core member 1 and the cross core member in turn secured to the base member 10. The magnet 3 has an elongated cross section in a direction perpendicular to the plane of the drawing so that its upper end is coextensive laterally with the armature 5. Two bolts 12 (only one of which is shown in the drawing) secure the magnet 3 to the cross member 1 and extend upward through suitable enlarged apertures in the armature thereby to secure pivotally the armature in place. As shown, the upper end of each bolt 12 extending through the armature is of smaller diameter and is provided with a nut 7. For the purpose of decreasing the magnetic reluctance of the air gaps the upper ends of the legs 2 and 4 are provided with enlarged disc-shaped pole members 13 and 14 made of magnetic material, the upper faces of which constitute pole faces for the armature which has a width at least as great as the diameter of the pole members.

Surrounding the leg 4 is a series coil 15 having its ends connected to terminals 16 and 17 which are in turn secured to the insulating base 10.

Mounted also on the base 10 is a normally closed control switch 18 having connection terminals 19 extending downward through the base 10 and by means of which the switch is secured to the base. This switch is operated by plunger 20 which engages the left-hand end of the armature. When the armature is in its biased position shown, the plunger 20 is pressed down against a biasing spring thereby to maintain the switch 18 open, as indicated diagrammatically in Fig. 2.

This control device shown in Fig. 1 is connected in the armature circuit of a direct current electric driving motor 21, as shown in Fig. 2, while the switch 18 is connected so that when it closes, it short-circuits all or a portion of a resistance 22 in circuit with the shunt field winding 23 of the motor thereby increasing the field excitation of the motor.

The winding 15 is connected in the direct current motor circuit in such manner that the magnetic polarity of the pole face 14 is the same as the polarity of the upper end of the magnet 3 when the motor 21 is operating as a driving motor. Under these conditions, the permanent magnet flux and the flux set up by the coil oppose each other in the leg 4 and across the air gap between the pole 14 and the armature, while these two fluxes are in the same direction in the leg 2. The permanent magnet has a low permeability for magnetic flux as compared with the two outside legs and, therefore, relatively little of the flux set up by the coil passes through the middle leg constituted by the permanent magnet.

Thus with motoring armature current through the coil 15, it will be observed that the armature is pulled against the pole 13 with a force which increases with the value of the motoring current so that the armature is maintained in the position shown in the drawing as long as the motor is driving the load.

In the event of an overhauling load, such as when the motor is operating hoist or winch, the current in the coil 15 reverses and likewise the flux through the leg 4 so that the coil flux adds to the flux of the permanent magnet in the leg 4 and across the air gap and opposes the permanent magnet flux in the leg 2. Thus the magnetic pull of the pole 14 on the armature increases with the current in the coil while at the same time the pull of the magnetic pole 13 on the left-hand end of the armature decreases. When this regenerative current reaches a predetermined maximum value, which is a measure of a predetermined maximum overhauling safe speed for the motor and load, the attraction for the right-hand end of the armature is great enough to pull the armature into engagement with the pole face 14 against the biasing force of the spring 8. This closes the switch 18 whereby the resistance 22 is short-circuited for increased field excitation of the motor and increased regenerative braking by the motor. This increased regenerative braking decreases the speed of the motor and load to a safe value.

It will be observed that when the armature is moved by the coil 15, it is held in that attracted position with a force which increases with the increase in current in the coil. This prevents the possibility of false operation of the armature back to its first position in the event of extraordinary regenerative braking conditions producing an extremely heavy braking current.

When the regenerative braking current in the coil 15 decreases to a predetermined minimum value, which is lower than the current value required to pick up the armature, the armature is operated by the spring 8 back to its normal position shown in the drawing. Calibration for this dropout value of the current is made by means of an adjustment screw 24 in the armature which cooperates with the pole 14. This screw is made from a metal having a low permeability such as Monel metal. It effects an adjustable spacing between the armature and the pole face when the armature is in its picked-up position. An increase in this spacing increases the current value at which the armature is moved to its other position by the spring.

Snap action of the armature from one position to the other is obtained by providing a spring 8 having a very low force gradient. In other words, when the armature starts to move against the force of the spring, the spring force does not increase appreciably. At the same time, however, the magnetic forces applied to the armature increase very fast so that the armature is accelerated rapidly to its attracted position.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is:

1. Reverse current responsive control means comprising a three-legged magnet core, the middle one of said legs being provided with means for producing a predetermined polarizing magnetic flux in said magnet core, an armature mounted in magnetic flux conducting relation with said middle leg and for pivotal movement to an attracted position with one or the other of the two outside legs, spring means having a low force gradient biasing said armature to a first attracted position with a first of said outer legs, a coil on only the second of said outer legs, electric connections for normally energizing said coil with a direct current in a direction to produce a magnetic flux in the same direction as said polarizing flux in said first outer leg and opposite to said polarizing flux in said second outer leg thereby normally to hold said armature in said first attracted position with the aid of said spring means, said coil when energized in the opposite direction reversal of current producing a magnetic flux in opposition to said polarizing flux in said first outer leg and in the same direction as said polarizing flux in said second outer leg thereby in response to a predetermined reverse current in said coil to move said armature with a snap action against its bias to its attracted position with said second outer leg, and electric circuit control means operated by said armature.

2. Reverse current responsive control means comprising a three-legged magnet core, the middle one of said legs constituting a permanent magnet having a low permeability for producing a predetermined polarizing flux in said magnet core, an armature mounted for pivotal movement on said middle leg into engagement with one or the other of the two outside legs, spring means having a low force gradient biasing said armature to a first attracted position in engagement with a first of said outer legs, a coil on only the second of said outer legs, electric connections for energizing said coil with direct current in a direction to produce a magnetic flux in the same direction as said polarizing flux in said first outer leg and opposite to said polarizing flux in said second outer leg thereby normally to hold said armature in said first attracted position, with the aid of said spring means, said coil when energized in the opposite direction upon reversal of current producing a magnetic flux opposing said polarizing flux in said first outer leg and in the same direction as said polarizing flux in said second outer leg thereby in response to a predetermined reverse current in said coil to move said armature with a snap action against the bias of said spring means to its attracted position in engagement with said second outer leg, and electric switch means operated by said armature.

CHESTER I. HALL.

REFERENCES CITED

The following references are of record in the file of this patent:

UNITED STATES PATENTS

| Number | Name | Date |
| --- | --- | --- |
| 1,420,935 | Lucas et al. | June 27, 1922 |
| 1,479,001 | Lockett | Jan. 1, 1924 |
| 2,330,101 | Winter | Sept. 21, 1943 |

FOREIGN PATENTS

| Number | Country | Date |
| --- | --- | --- |
| 116,981 | Great Britain | July 4, 1918 |